(12) United States Patent
Alibay et al.

(10) Patent No.: US 10,395,383 B2
(45) Date of Patent: Aug. 27, 2019

(54) METHOD, DEVICE AND APPARATUS TO ESTIMATE AN EGO-MOTION OF A VIDEO APPARATUS IN A SLAM TYPE ALGORITHM

(71) Applicant: STMicroelectronics SA, Montrouge (FR)

(72) Inventors: Manu Alibay, Vincennes (FR); Stéphane Auberger, Saint-Maur-des-Fosses (FR); Bogdan-Florin Stanciulescu, Paris (FR)

(73) Assignee: STMICROELECTRONICS SA, Montrouge (FR)

( * ) Notice: Subject to any disclaimer, the term of this patent is extended or adjusted under 35 U.S.C. 154(b) by 0 days.

(21) Appl. No.: 15/381,928

(22) Filed: Dec. 16, 2016

(65) Prior Publication Data

US 2017/0178355 A1 Jun. 22, 2017

(30) Foreign Application Priority Data

Dec. 17, 2015 (FR) ...................................... 15 62589
Nov. 18, 2016 (EP) ...................................... 16199463

(51) Int. Cl.
*G06K 9/00* (2006.01)
*G06T 7/70* (2017.01)

(52) U.S. Cl.
CPC ...... *G06T 7/70* (2017.01); *G06T 2207/30244* (2013.01)

(58) Field of Classification Search
None
See application file for complete search history.

(56) References Cited

U.S. PATENT DOCUMENTS

| | | | |
|---|---|---|---|
| 9,430,847 B2 * | 8/2016 | Ramalingam | G06K 9/52 |
| 2001/0033692 A1 | 10/2001 | Borneo et al. | |
| 2005/0094852 A1 | 5/2005 | Kumar et al. | |
| 2005/0105627 A1 | 5/2005 | Sun et al. | |

(Continued)

FOREIGN PATENT DOCUMENTS

FR 3 027 144 A1 4/2016

OTHER PUBLICATIONS

H. Lim, J. Lim and H. J. Kim, "Real-time 6-DOF monocular visual SLAM in a large-scale environment," 2014 IEEE International Conference on Robotics and Automation (ICRA), Hong Kong, 2014, pp. 1532-1539. doi: 10.1109/ICRA.2014.6907055.*

(Continued)

*Primary Examiner* — Tahmina N Ansari
(74) *Attorney, Agent, or Firm* — Seed IP Law Group LLP

(57) ABSTRACT

A method estimates an ego-motion of an apparatus between a first image and a second image of a succession of images captured by the apparatus, in a SLAM type algorithm containing a localization part including the ego-motion estimating and a mapping part. The ego-motion comprises a 3D rotation of the apparatus and a position variation of the apparatus in the 3D space, and the ego-motion estimating comprises performing a first part and performing a second part after having performed the first part, the first part including estimating the 3D rotation of the apparatus and the second part including, the 3D rotation having been estimated, estimating the position variation of the apparatus in the 3D space.

34 Claims, 7 Drawing Sheets

(56) References Cited

U.S. PATENT DOCUMENTS

| | | | |
|---|---|---|---|
| 2005/0182518 A1 | 8/2005 | Karlsson | |
| 2008/0137908 A1* | 6/2008 | Stein | G06K 9/00818 |
| | | | 382/103 |
| 2011/0169923 A1 | 7/2011 | Dellaert et al. | |
| 2011/0285811 A1* | 11/2011 | Langlotz | H04N 5/23238 |
| | | | 348/37 |
| 2012/0070037 A1 | 3/2012 | Polle | |
| 2012/0121161 A1 | 5/2012 | Eade et al. | |
| 2013/0080045 A1 | 3/2013 | Ma et al. | |
| 2014/0212027 A1 | 7/2014 | Hallquist et al. | |
| 2015/0099025 A1 | 4/2015 | Spalt | |
| 2015/0142248 A1 | 5/2015 | Han et al. | |
| 2015/0304634 A1* | 10/2015 | Karvounis | H04N 13/239 |
| | | | 348/46 |
| 2015/0363938 A1* | 12/2015 | Ramalingam | G06K 9/52 |
| | | | 382/103 |
| 2016/0034452 A1 | 2/2016 | Ramanathan et al. | |
| 2017/0177980 A1 | 6/2017 | Alibay et al. | |
| 2017/0178347 A1 | 6/2017 | Alibay et al. | |
| 2017/0178355 A1* | 6/2017 | Alibay | G06T 7/70 |
| 2017/0180644 A1 | 6/2017 | Alibay et al. | |

OTHER PUBLICATIONS

Kurz et al., "Inertial sensor-aligned visual feature descriptors," 2011 IEEE Conference on Computer Vision and Pattern Recognition (CVPR), Colorado Springs, CO, Jun. 20-25, 2011, 6 pages.

Levi, "Adding rotation invariance to the BRIEF descriptor," *Gil 's CV blog*, Jan. 2, 2015, retrieved from https://gilscvblog.com/2015/01/02/adding-rotation-invariance-to-the-brief-descriptor/ on Apr. 25, 2017, 20 pages.

Moulon et al., "Adaptive Structure from Motion with a Contrario Model Estimation," in *Lecture Notes in Computer Science 7727—Asian Conference on Computer Vision 2012 Part IV*, Lee et al. (eds.), Springer-Verlag Berlin Heidelberg, 2013, pp. 257-270.

Ababsa et al., "Inertial and Vision Head Tracker Sensor Fusion Using a Particle Filter for Augmented Reality Systems," 2004 International Symposium on Circuits and Systems, Vancouver, BC, Canada, May 23-26, 2004, 4 pages.

Armesto et al., "On multi-rate fusion for non-linear sampled-data systems: Application to a 6D tracking system," *Robotics and Autonomous Systems* 56:706-715, 2008.

Bleser et al., Using Optical Flow for Filling the Gaps in Visual-Inertial Tracking, 18th European Signal Processing Conference, Aalborg, Denmark, Aug. 23-27, 2010, 5 pages.

Huster et al., "Relative Position Estimation for Intervention-Capable AUVS by Fusing Vision and Inertial Measurements," 12th International Symposium on Unmanned Untethered Submersible Technology, Durham, New Hampshire, Aug. 2001, 11 pages.

Li et al., "A Reliable and Accurate Indoor Localization Method Using Phone Inertial Sensors," 14th ACM International Conference on Ubiquitous Computing, Pittsburgh, Pennsylvania, Sep. 5-8, 2012, 10 pages.

Trawny et al., "Vision-Aided Inertial Navigation for Pin-Point Landing using Observations of Mapped Landmarks," *Journal of Field Robotics* 24(5):357-378, 2007.

Vernaza et al., "Rao-Blackwellized Particle Filtering for 6-DOF Estimation of Attitude and Position via GPS and Inertial Sensors," 2006 IEEE International Conference on Robotics and Automation, Orlando, Florida, May 15-19, 2006, 8 pages.

Klingbeil et al., "A Wireless Sensor Network for Real-time Indoor Localization and Motion Monitoring," 2008 International Conference on Information Processing in Sensor Networks, St. Louis, MO, Apr. 22-24, 2008, 12 pages.

Kneip et al., "Robust Real-Time Visual Odometry with a Single Camera and an IMU," The $22^{nd}$ British Machine Vision Conference, Dundee, Scotland, Aug. 29-Sep. 2, 2011, 11 pages.

Liang et al., "Reduced-Complexity Data Acquisition System for Image-Based Localization in Indoor Environments," 2013 International Conference on Indoor Positioning and Indoor Navigation, Montbeliard-Belfort, France, Oct. 28-31, 2013, 9 pages.

Merzban et al., "Toward Multi-Stage Decoupled Visual SLAM System," 2013 IEEE International Symposium on Robotic and Sensors Environments (ROSE), Washington, DC, Oct. 21-23, 2013, 6 pages.

Tanaka et al., "Incremental RANSAC for Online Relocation in Large Dynamic Environments," 2006 IEEE International Conference on Robotics and Automation, Orlando, FL, May 15-19, 2006, 8 pages.

Voigt et al., "Robust Embedded Egomotion Estimation," 2011 IEEE/RSJ International Conference on Intelligent Robots and Systems, San Francisco, CA, Sep. 25-30, 2011, 6 pages.

Alahi et al., "FREAK: Fast Retina Keypoint," *2012 IEEE Conference on Computer Vision and Pattern Recognition (CVPR)*, Providence, Rhode Island, Jun. 16-21, 2012, pp. 510-517.

Alibay et al., "Hybrid Visual and Inertial Ransac for Real-Time Motion Estimation," *2014 IEEE International Conference on Image Processing (ICIP)*, Paris, France, Oct. 27-30, 2014, pp. 179-183.

Alibay, "Extended sensor fusion for embedded video applications," Thesis to obtain a Doctorate in Computer Science and Robotics from the Paris Institute of Technology, Dec. 18, 2015, 138 pages.

Calonder et al., "BRIEF: Binary Robust Independent Elementary Features," $11^{th}$ *European Conference on Computer Vision*, Hersonissos, Greece, Sep. 5-11, 2010, 14 pages.

Calonder et al., "BRIEF: Computing a Local Binary Descriptor Very Fast," *IEEE Transactions on Pattern Analysis and Machine Intelligence* 34(7):1281-1298, Jul. 2012.

Civera et al., "1-Point RANSAC for EKF Filtering. Application to Real-Time Structure from Motion and Visual Odometry," *2009 IEEE/RSJ International Conference on Intelligent Robots and Systems (IROS 2009)*, St.Louis, Missouri, Oct. 10-15, 2009, 32 pages.

Davison, "MonoSLAM: Real-Time Single Camera SLAM," *IEEE Transactions on Pattern Analysis and Machine Intelligence* 29(6):1052-1067, Jun. 2007.

Davison, "Real-Time Simultaneous Localisation and Mapping with a Single Camera," *Proceedings of the Ninth IEEE International Conference on Computer Vision (ICCV'03)*, Nice, France, Oct. 13-16, 2003, 8 pages.

Dubrofsky, "Homography Estimation," A master's essay submitted in partial fulfillment of the requirements for the degree of Master of Science in The Faculty of Graduate Studies (Computer Science) from the University of British Columbia (Vancouver), 32 pages, Mar. 2009.

Durrie et al., "Vision-Aided Inertial Navigation on an Uncertain Map Using Particle Filter," *2009 IEEE International Conference on Robotics and Automation*, Kobe, Japan, May 12-17, 2009, pp. 4189-4194.

Fischler et al., "Random Sample Consensus: A Paradigm for Model Fitting with Applications to Image Analysis and Automated Cartography," *Communications of the ACM* 24(6):381-395, Jun. 1981.

Hartley et al., *Multiple View Geometry in Computer Vision*, Cambridge, UK, Cambridge University Press, 2003, 673 pages.

Hartley, "In Defence of the 8-point Algorithm" $5^{th}$ *IEEE International Conference on Computer Vision*, Cambridge, Massachusetts, Jun. 20-23, 1995, pp. 1064-1070.

Holmes et al., "An $O(N^2)$ Square Root Unscented Kalman Filter for Visual Simultaneous Localization and Mapping," *IEEE Transactions on Pattern Analysis and Machine Intelligence* 31(7):1251-1263, Jul. 2009.

Horn et al., "Determining Optical Flow," *Artificial Intelligence* 17(1-3):185-203, Aug. 1981.

Hwangbo et al., "Inertial-Aided KLT Feature Tracking for a Moving Camera," *2009 IEEE/RSJ International Conference on Intelligent Robots and Systems*, St. Louis, Missouri, Oct. 11-15, 2009, pp. 1909-1916.

Jia et al., "Probabilistic 3-D Motion Estimation for Rolling Shutter Video Rectification from Visual and Inertial Measurements," $14^{th}$ *IEEE International Workshop on Multimedia Signal Processing (MMSP)*, Banff, Canada, Sep. 17-19, 2012, pp. 203-208.

(56) References Cited

OTHER PUBLICATIONS

Julier et al., "A New Extension of the Kalman Filter to Nonlinear Systems," *Proceedings of SPIE 3068, Signal Processing, Sensor Fusion, and Target Recognition VI*, Orlando, Florida, Apr. 21, 1997, 12 pages.
Kalman, "A New Approach to Linear Filtering and Prediction Problems," *Journal of Basic Engineering* 82(1):35-45, Mar. 1960.
Karpenko et al., "Digital Video Stabilization and Rolling Shutter Correction using Gyroscopes," *Stanford Tech Report CTSR* Mar. 2011, 7 pages.
Klein et al., "Parallel Tracking and Mapping for Small AR Workspaces," *6th IEEE and ACM International Symposium on Mixed and Augmented Reality*, Nara, Japan, Nov. 13-16, 2007, 10 pages.
Kurz et al., "Gravity-Aware Handheld Augmented Reality," *IEEE International Symposium on Mixed and Augmented Reality 2011*, Basel, Switzerland, Oct. 26-29, 2011, pp. 111-120.
Kurz et al., "Handheld Augmented Reality involving gravity measurements," *Computers & Graphics* 36:866-883, 2012.
Lepetit et al., "EPnP: An Accurate O(n) Solution to the PnP Problem," *International Journal of Computer Vision* 81(2):155-166, 2009.
Leutenegger et al., "BRISK: Binary Robust Invariant Scalable Keypoints," *2011 IEEE International Conference on Computer Vision*, Barcelona, Spain, Nov. 6-13, 2011, 8 pages.
Liu et al., "Sequential Monte Carlo Methods for Dynamic Systems," *Journal of the American Statistical Association* 93(443):1032-1044, Sep. 1998.
Lobo et al., "Vision and Inertial Sensor Cooperation Using Gravity as a Vertical Reference," *IEEE Transactions on Pattern Analysis and Machine Intelligence* 25(12):1597-1608, Dec. 2003.
Lowe, "Distinctive Image Feature from Scale-Invariant Keypoints," *International Journal of Computer Vision* 60(2):91-110, Nov. 2004.
Montemerlo et al., "FastSLAM: A Factored Solution to the Simultaneous Localization and Mapping Problem," *Proceedings of the 18th National Conference on Artificial Intelligence*, Edmonton, Canada, Jul. 28-Aug. 1, 2002, 6 pages.
Mourikis et al., "A Multi-State Constraint Kalamn Filter for Vision-aided Inertial Navigation," *2007 IEEE International Conference on Robotics and Automation*, Rome, Italy, Apr. 10-14, 2007, 8 pages.
Murray et al., *A Mathematical Introduction to Robotic Manipulation*, CRC Press, 1994, 474 pages.
Nistér, "An Efficient Solution to the Five-Point Relative Pose Problem," *IEEE Transactions on Pattern Analysis and Machine Intelligence* 26(6):756-770, Apr. 2004.
Nistér, "Preemptive RANSAC for Live Structure and Motion Estimation," *Proceedings of the 9th IEEE International Conference on Computer Vision*, 2003, pp. 199-206.

Rosten et al., "Faster and Better: A Machine Transactions on Pattern Analysis and Machine Learning Approach to Corner Detection," *IEEE Transactions on Pattern Analysis and Machine Intelligence* 32(1):105-199, Jan. 2010.
Rosten et al., "Machine learning for high-speed corner detection," *9th European Conference on Computer Vision*, Graz, Austria, May 7-13, 2006, 14 pages.
Rublee et al., "ORB: an efficient alternative to SIFT or SURF," *2011 IEEE International Conference on Computer Vision*, Barcelona, Spain, Nov. 6-13, 2011, 8 pages.
Scaramuzza et al., "Tutorial: Visual Odometry Part I: The First 30 Years and Fundamentals," *IEEE Robotics & Automation Magazine* 18(4):80-92, Dec. 2011.
Shoemake, "Animating Rotation with Quaternion Curves," *ACM SIGGRAPH Computer Graphics* 19(3):245-254, Jul. 1985.
Strasdat et al., "Real-time Monocular SLAM: Why Filter?," *2010 IEEE International Conference on Robotics and Automation*, Anchorage, Alaska, May 3-8, 2010, pp. 2657-2644.
Triggs et al., "Bundle Adjustment—A Modern Synthesis," *Vision Algorithms: Theory and Practice* 1883:298-372, 2000.
You et al., "Fusion of Vision and Gyro Tracking for Robust Augmented Reality Registration," *Proceedings of the IEEE Virtual Reality 2001 Conference*, Yokohama, Japan, Mar. 13-17, 2001, 8 pages.
You et al., "Hybrid Inertial and Vision Tracking for Augmented Reality Registration," *Proceedings of the IEEE Virtual Reality 1999 Conference*, Houston, Texas, Mar. 13-17, 1999, 8 pages.
You et al., "Orientation Tracking for Outdoor Augmented Reality Registration," *IEEE Computer Graphics and Applications* 19(6):36-42, Nov./Dec. 1999.
Zhang, "A Flexible New Technique for Camera Calibration," *IEEE Transactions on Pattern Analysis and Machine Intelligence* 22(11):1330-1334, Nov. 2000.
Eade et al., "Edge landmarks in monocular SLAM," *Image and Vision Computing* 27:588-596, 2009.
Hilsenbeck et al., "Graph-based Data Fusion of Pedometer and WiFi Measurements for Mobile Indoor Positioning," *2014 ACM International Joint Conference on Pervasive and Ubiquitous Computing (UbiComp 2014)*, Seattle, WA, Sep. 13-17, 2014, 12 pages.
Comaniciu, "Density Estimation-based Information Fusion for Multiple Motion Computation," *IEEE Proceedings of the Workshop on Motion and Video Computing (Motion'02)*, Orlando, Florida, USA, Dec. 9, 2002, pp. 241-246.
Hafez et al., "Particle-filter-based Pose Estimation from Controlled Motion with Application to Visual Servoing," *International Journal of Advanced Robotics Systems* 11(10):177, 2014. (11 pages).
Oka et al., "Head Pose Estimation System Based on Particle Filtering with Adaptive Diffusion Control," *MVA—IAPR Conference on Machine Vision Applications*, Tsukuba Science City, Japan, May 16-18, 2005, pp. 586-589.
Leizea et al., "Real time non-rigid 3D surface tracking using particle filter," *Computer Vision and Image Understanding* 133:51-65, 2015.

\* cited by examiner

Frame coordinates                World coordinates

METHOD, DEVICE AND APPARATUS TO ESTIMATE AN EGO-MOTION OF A VIDEO APPARATUS IN A SLAM TYPE ALGORITHM

BACKGROUND

Technical Field

Implementations and embodiments of the disclosure relate to determining movement of an image sensor or apparatus (e.g., a video camera) between successive video images (frames) captured by said apparatus, such as one incorporated in a platform, such as a digital tablet or a mobile cellular telephone for example, in particular the estimation of ego-motion of said apparatus (i.e., the 3D motion of said apparatus in an environment (and accordingly the ego-motion of the platform incorporating said apparatus)) in a SLAM type algorithm.

Description of the Related Art

Simultaneous Localization And Mapping (SLAM) comprises estimating the ego-motion of the apparatus (and accordingly the platform) and mapping its surrounding scene at the same time.

An ego-motion of an apparatus between two captured images comprises typically a 3D rotation of said apparatus and a position variation of said apparatus in the 3D space.

Conventional SLAM type algorithms try to directly solve at a time the orientation (3D rotation) and the position.

But such a processing is complex because of lack of texture and outliers in images. Such troubles may be overcome by using inertial measurements which are however available for orientation but not for spatial position.

BRIEF SUMMARY

According to an embodiment of the disclosure an improvement in SLAM type algorithms is proposed, in particular in the localization part thereof including the ego-motion estimation.

According to an embodiment it is proposed to first solve orientation, by using advantageously inertial sensors as assisting tools, and then estimate position with orientation known.

According to an aspect of the disclosure, a method is proposed for estimating an ego-motion of an apparatus (e.g., a camera for example incorporated in a platform, such as a smartphone or a tablet) between a first image (for example a previous image) and a second image (for example a current image) of a succession of images captured by said apparatus, in a SLAM type algorithm containing a localization part including said ego-motion estimating and a mapping part.

According to a general feature of this aspect, said ego-motion of the apparatus (and accordingly of the eventual platform) comprises a 3D rotation of the apparatus and a position variation of the apparatus in the 3D space, and said ego-motion estimating comprises performing a first part and performing a second part after having performed said first part, said first part including estimating said 3D rotation of said apparatus and said second part including, said 3D rotation having been estimated, estimating said position variation of the apparatus in the 3D space.

According to an embodiment said SLAM type algorithm is an hybrid SLAM algorithm, i.e., a visual-inertial SLAM algorithm.

According to an embodiment estimating said 3D rotation is performed by a random sample consensus (RANSAC) type algorithm, preferably an hybrid RANSAC algorithm.

Said hybrid RANSAC algorithm may preferably comprise a dynamic threshold adaptation using depths of points in the images, such as the one disclosed in a U.S. patent application filed in the name of STMICROELECTRONICS SA the same day as the present U.S. patent application and entitled "Threshold Determination in For Example a RANSAC Type Algorithm," which is incorporated by reference herein in its entirety.

According to an embodiment estimating said position variation of the apparatus in the 3D space comprises a visual measurement based filtering. Many well known filtering techniques are possible such as those using a Kalman type filter or a particle type filter.

However said visual measurement based filtering comprises advantageously a visual measurement based particle filtering, and preferably a visual measurement based particle filtering using a dynamic particle filter parameterization such as one disclosed in a U.S. patent application filed in the name of STMICROELECTRONICS SA the same day as the present U.S. patent application and entitled "Dynamic Particle Filter Parameterization," which is incorporated by reference herein in its entirety.

Estimating said position variation of the apparatus in the 3D space further advantageously comprises guiding the particle spreading with a pedestrian step detection technique using accelerometers data.

According to an embodiment, said ego-motion estimating further comprises, before estimating said 3D rotation, generating for said first image, binary descriptors describing visual features of said first image, each binary descriptor being associated with a given point in said first image, for example a keypoint or point of interest.

Such descriptors may be generated in a manner disclosed in a U.S. patent application filed in the name of STMICROELECTRONICS SA the same day as the present U.S. patent application and entitled "Method and Device for Generating Binary Descriptors in Video Frames," which is incorporated by reference herein in its entirety.

Briefly speaking said descriptor generation comprises determining a pattern of points pairs around said given point in the first image, processing said pattern of points of said first image with a tridimensional rotation information, obtained for example from inertial measurements, representative of said apparatus rotation between the first image and the image preceding said first image, and performing intensity comparison processing between the two points of each pair.

According to another aspect of the disclosure, a device is proposed, comprising processing means (for example realized by a microprocessor executing software stored on a nontransitory computer readable medium such as a RAM or other memory device) for estimating an ego-motion of an apparatus between a first image and a second image of a succession of images captured by said apparatus, in a SLAM type algorithm containing a localization part including said ego-motion estimating and a mapping part.

According to a general feature of this another aspect of the disclosure, said ego-motion of the apparatus comprises a 3D rotation of the apparatus and a position variation of the apparatus in the 3D space, and said processing means comprises a first processing module configured to perform an estimation of said 3D rotation of said apparatus and a second processing module configured to perform an estimation of said position variation of the apparatus in the 3D space, and control means configured to activate the first processing module and the second processing module after the first processing module has estimated said 3D rotation.

According to an embodiment, said SLAM type algorithm is an hybrid SLAM algorithm.

According to an embodiment, said first processing module is configured to estimate said 3D rotation by a RANSAC type algorithm, preferably an hybrid RANSAC algorithm.

According to an embodiment, said first processing module is further configured to perform a dynamic threshold adaptation using depths of points in the first image.

According to an embodiment, said second processing module is configured to estimate said position variation of the apparatus in the 3D space by using a visual measurement based filter means.

According to an embodiment, said visual measurement based filter means comprises a visual measurement based particle filter means using dynamic particle filter parameterization means.

According to an embodiment, said second processing module is further configured to guide the particle spreading of said particle filter means with a pedestrian step detection technique using accelerometers data.

According to an embodiment, said processing means further comprises a pre-processing module configured to, before the estimation of said 3D rotation, to generate for said first image, binary descriptors describing visual features of said first image, each binary descriptor being associated with a given point in said first image, said a pre-processing module being configured to perform said descriptor generation comprising determining a pattern of points pairs around said given point in the first image, processing said pattern of points of said first image with a tridimensional rotation information, obtained for example from inertial measurements, representative of said apparatus rotation between the first image and the image preceding said first image, and performing intensity comparison processing between the two points of each pair.

According to another aspect of the disclosure a platform is proposed, for example a smartphone or a tablet, including an apparatus, a device as defined above and inertial sensors.

BRIEF DESCRIPTION OF THE SEVERAL VIEWS OF THE DRAWINGS

Other advantages and features of the disclosure will appear in the detailed description below and in the appended drawings which are no limitative, in which.

DETAILED DESCRIPTION

Figure 1:
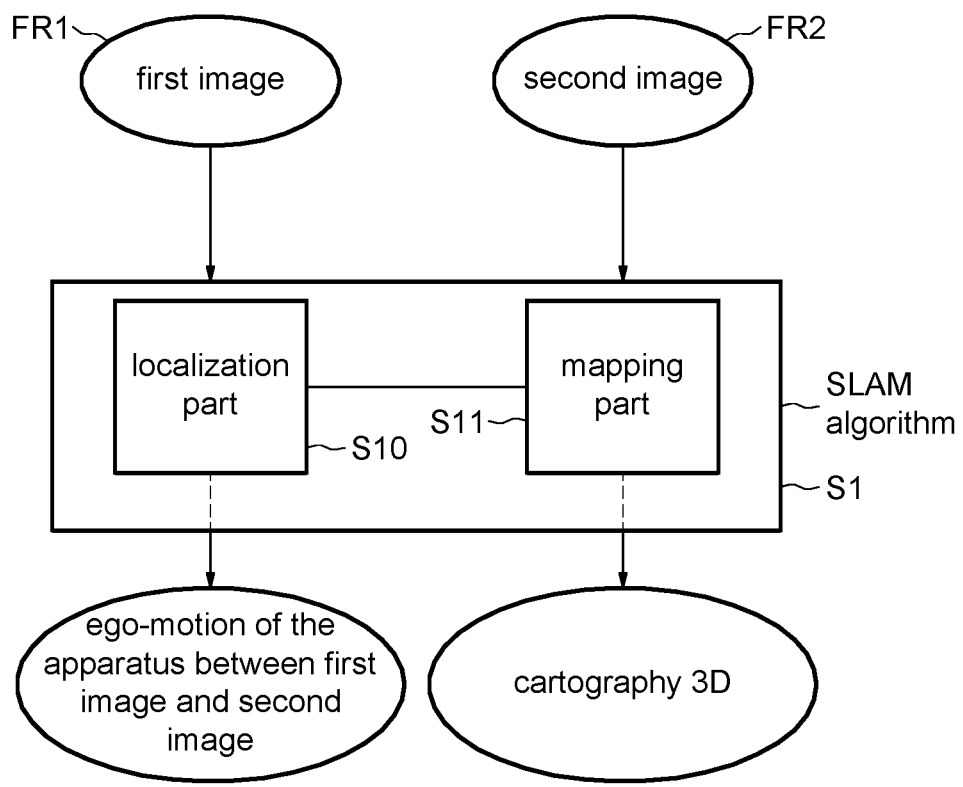
FIGS. 1 and 2 illustrate diagrammatically embodiments of a method according to the disclosure.

Simultaneous Localization And Mapping (SLAM) involves estimating the 3D motion of a platform in an environment (also known as ego-motion) and mapping its surrounding scene.

Cameras and inertial sensors can be fused in order to perform an accurate and robust estimation, using the characteristics of each sensor, leading to an hybrid visual inertial SLAM.

Two main application domains utilize hybrid visual inertial SLAM: augmented reality and robotic navigation. Particular aimed applications in this disclosure are mainly indoor navigation and augmented reality for handheld devices such as smartphones and tablets.

Many studies have been proposed concerning this subject. The simultaneous motion estimation and building of the 3D scene is a very challenging problem with the sole utilization of video sequence. In the literature, applications created for mobile robotics or augmented realities encounter robustness issues. Some approaches combining cameras with other sensors (stereo-vision, laser, GPS) improve the robustness but are not relevant in the context of embedded platforms.

Recently, the main drawbacks of state-of-the art SLAM approaches are the following: heavy computational cost, relatively complex methods, inaccurate results based only on video sensors. This is where the use of fusion with inertial and magnetic sensors is particularly advantageous by completing the image and playing as substitution for more complex sensors used in tradition mobile robotics. The estimation of the camera motion is tightly coupled to inertial and visual fusion, allowing the improvement of the 3D trajectory, therefore also impacting the 3D mapping. A decrease of the computational cost is also aimed.

SLAM can be separated in two fields: dense-SLAM, where a very high proportion of points in the scene are considered, and feature-based SLAM, which performs a much more sparse estimation of points in the environment. Dense (or semi-dense) approaches have become increasingly popular recently, allowing reconstructing many points of the scene with a whole-image alignment. While showing good efficiency, they remain very demanding in terms of computational resource. On memory side, the dense representation of the map also limits the size of the environment which can be reconstructed, which is a drawback for applications such as navigation. Therefore, although the disclosure is compatible with dense-SLAM, it is preferable to use feature-based SLAM.

Estimating the ego motion of a platform is a complex task, to be done with accuracy and robustness. Many sensors can be used to fulfill this purpose, from proprioceptive ones that measures only platform-related quantities (inertial sensors, wheels speed, GPS . . . ) to sensors that records data from the external environment, deducing the motion regarding the temporal changes that occur (monocular cameras, stereo vision, laser, radars . . . ). Monocular cameras are a very popular type of sensor in ego motion computation for many reasons. They are cheap, do not present high constraints in terms of weight or power, and their recording can be utilized for multiple purposes, making it a very flexible sensor, used for many years.

Computing a motion between two images (frames) without computing a global consistent map is called visual odometry. It aims at incrementally finding the trajectory and orientation of the mobile, possibly by building a local map of the environment, but without global optimization nor loop closure techniques.

An efficient way to perform visual odometry is to start with 2D correspondences techniques as they do not require any knowledge on the scene. Then, when a first local map is available with triangulation, a switch to a 3D to 2D correspondence can be performed. It is in effect more robust and accurate, as the geometry of the scene is available.

The additional process in SLAM compared to visual odometry is to obtain a globally consistent map. This induces that every 3D point estimated position should be updated when observed by the camera, and loop closure should be performed. Two main strategies exist for the visual SLAM: filtering techniques (probabilistic) and optimization-based procedures (determinist).

The SLAM problem can be treated as a probability density estimation problem. In this approach, the first two statistical moments (mean value and covariance) of the camera pose and 3D points are jointly estimated in a Bayesian filter, which is often either a Kalman filter (KF) or a particle filter. For the KF, an extended or unscented version is often used due to non-linearity of the system.

A general scheme of these filtering methods is the following. A dynamical temporal model of the system is used in the state of the filter, which are the physical values to be estimated: 3D orientation and position, along with their first derivate, rotation speed and translation speed. A representation of the locations of the points is also included in the state. In the case of KFs, the covariance of both pose and points locations is directly accessible through a covariance matrix. For particle filters it is rather implicitly estimated by the particles distributions.

In each case, the procedure is separated in two steps: propagation, or time update, and correction, or measurement update. The propagation step consists in applying the physical model temporal behavior on the state (and covariance for KFs) of the filter. For instance, the estimated 3D orientation of the filter will be updated with the speed orientation of the state. Correction uses external measurement to correct the state with inputs from the outside world. In the monocular SLAM case, those are often motion vectors obtained from 3D to 2D correspondences.

Another possible technique to solve the localization problem of the SLAM is to use optimization techniques. M-estimators are the gold standard way to perform this. The Parallel Tracking And Mapping (PTAM) algorithm separates the localization and mapping procedures in distinct threads, to make use of the multiple cores present on modern computers and smartphones architectures. The localization is performed in real-time using an M-estimator, while the mapping is done on a thread by applying Bundle Adjustment (BA).

As stated previously, the SLAM algorithm starts working based on a 3D "base" map. To perform this initialization, a few methods are possible:
a) To have a 3D model of the scene which it is tried to map on the observed frames.
b) To recognize a planar object in the scene (chessboard for instance), which can be used as a starting point to compute motion and map other objects, using planar homography decomposition techniques.
c) To compute a map based on 2D to 2D correspondences odometry, such as a fundamental matrix computation strategy.

The procedure c) is the most complex, but also the most general, as no requirement on the scene is needed. Thus, it is advantageous to apply method c) in the context of embedded platforms, where the aim is to perform video applications on many different scenes. The initialization procedure simply comprises for example performing a translational motion of approximately 15 centimeters. The motion should be preferably translational because this type of motion allows retrieving some information on the depth of the objects in the scene.

The lack of texture in some images impacts heavily the visual measurements, making classical filtering or optimization unstable. It appears that a direct integration of visual motion vectors in a filter without discarding outliers can severely degrade the ego-motion estimation, even if inertial readings are also fed to the filter. Optimization techniques can deal better with outliers, but can also severely diverge in case of a very large proportion of incorrect motion vectors.

Quick wrist motions create large rotations, leading to blurry content and important changes of viewpoint. Current techniques rarely manage to keep satisfying ego-motion estimation under such conditions. Moreover, the embedded inertial sensors that can be found in smartphones and tablets can be very noisy. While inertial readings provide more or less reliable 3D rotation estimation, computing position based on their measurements is a very inaccurate process, even with precise calibration: the only way to compute position is by a double integration of the accelerometer, which leads to heavy drift.

Thus according to a preferable embodiment, a novel method to perform visual-inertial odometry is proposed. It makes use of both optimization and filtering methods to estimate the ego-motion of the device with a sequential method, splitting the computation of the ego-motion in two phases: orientation and position. Orientation is first estimated using an optimization technique, the hybrid RANSAC that removes outliers and displays high robustness. Position is computed with a filtering stage that possesses a specific parameterization, reactive to the visual tracking quality and semantic information.

As a matter of fact MEMS (Micro ElectroMechanical System) inertial sensors offer an accurate and robust estimation of the orientation of the device. However, for position, the measurement are much less reliable, as only the accelerometer gives an information on it, and the double integration used leads to noise and drift. To better take into account these characteristics, it is thus proposed to advantageously split the ego-motion estimation in two, and perform several types of fusion for each step, including feature measurements.

For example, as it will be detailed thereafter, visual features are described with particular descriptors, leading to less errors under rotations in the feature matching process. A separation of the 3D rotation estimation of the camera and the calculus of its position in the 3D space is made, in order to provide the most optimal use of the combined strength of vision and inertial sensing.

The 3D camera rotation is preferably computed with a hybrid RANSAC-based algorithm. This method allows coping with high rotations and complex scenes, such as textureless sequences. It also removes the outliers, which is important to perform efficient localization.

At last, with 3D rotation known, a visual measurement-based particle filtering is preferably performed to compute the camera position. Embedded inertial sensors are very noisy, therefore it is very challenging to have a valid position estimation from their measurements. Rather than using directly the inertial measurement, The particle spreading is preferably guiding with a pedestrian step detection technique derived from accelerometers data.

Figure 2:
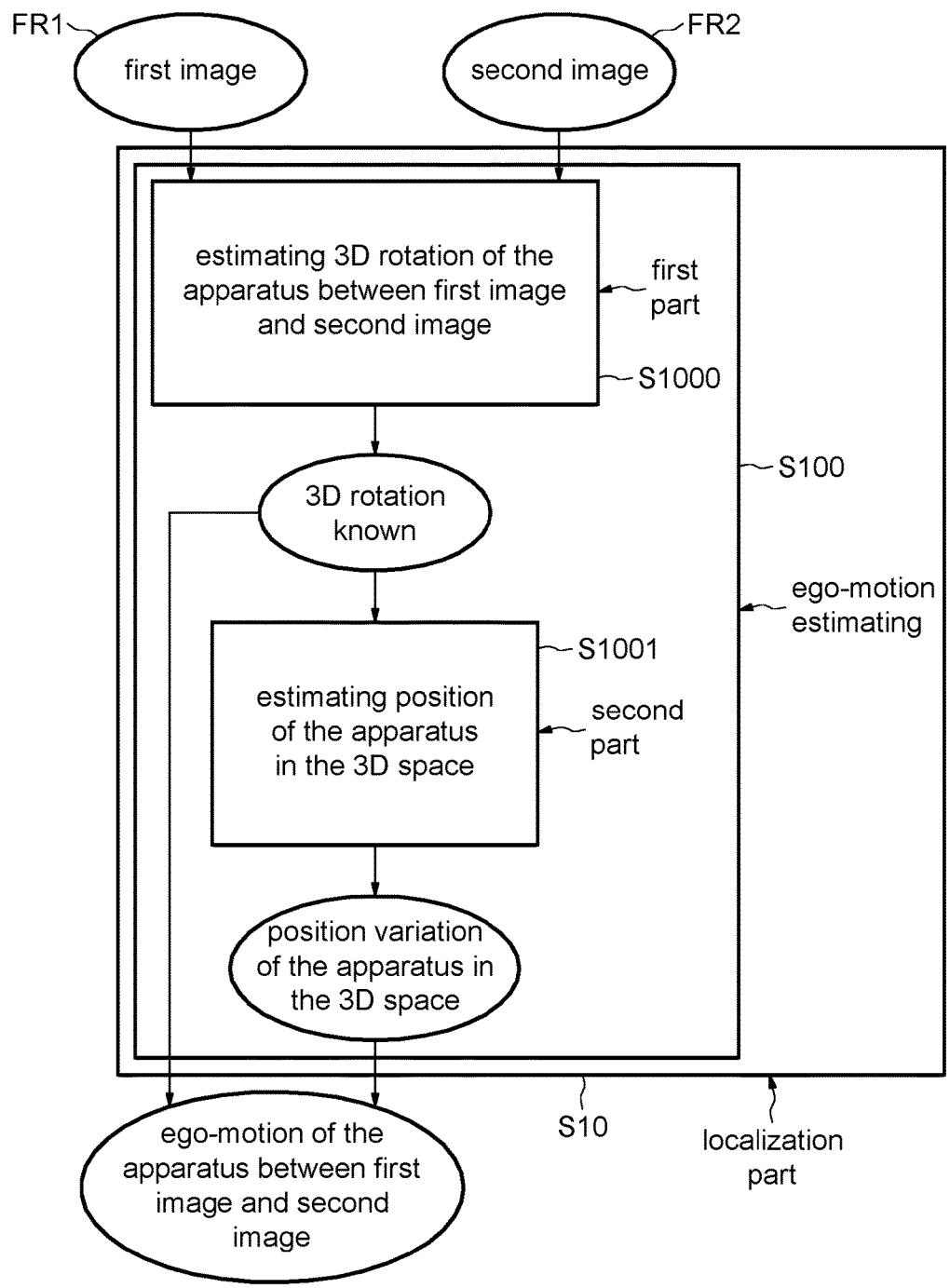

We refer now to FIGS. 1 and 2 which illustrate diagrammatically a first embodiment of a method according to the disclosure for estimating an ego-motion of an apparatus between a first image (or frame) FR1 and a second image (or frame) FR2 of a succession of images captured by said apparatus.

Said method uses a SLAM type algorithm S1 containing a localization part S10 including said ego-motion estimating and a mapping part S11 providing a cartography 3D.

Said SLAM type algorithm is preferably an hybrid SLAM algorithm, i.e., a visual-inertial SLAM algorithm.

The mapping part S11 may use for example the three above mentioned initialization techniques a), b) or c) and preferably the technique c), i.e., the computation a map based on 2D to 2D correspondences odometry, such as a fundamental matrix computation strategy.

As illustrated on FIG. 2, said ego-motion comprises a 3D rotation of the apparatus and a position variation of the apparatus in the 3D space, and said ego-motion estimating S100 comprises performing S1000 a first part and performing S1001 a second part after having performed said first part.

Said first part S1000 includes estimating said 3D rotation of said apparatus and said second part S1001 includes, said 3D rotation having been estimated, estimating said position variation of the apparatus in the 3D space.

Figure 3:
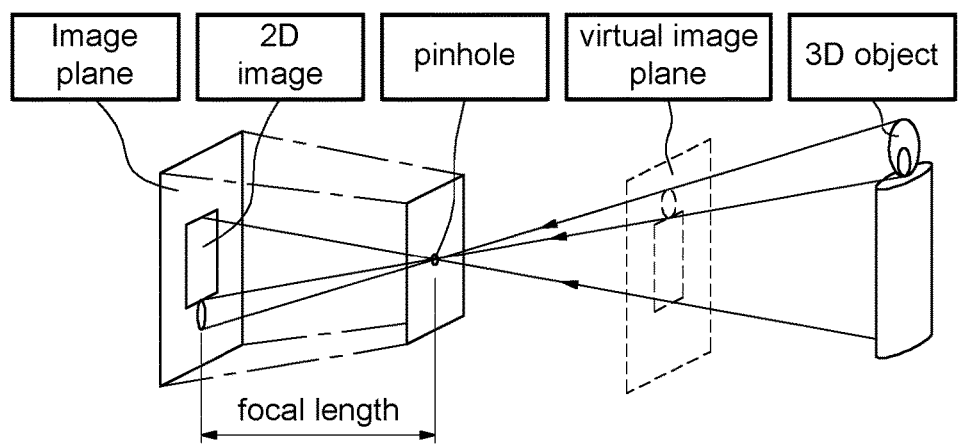
FIG. 3 illustrates a pinhole camera model.
Figure 4:
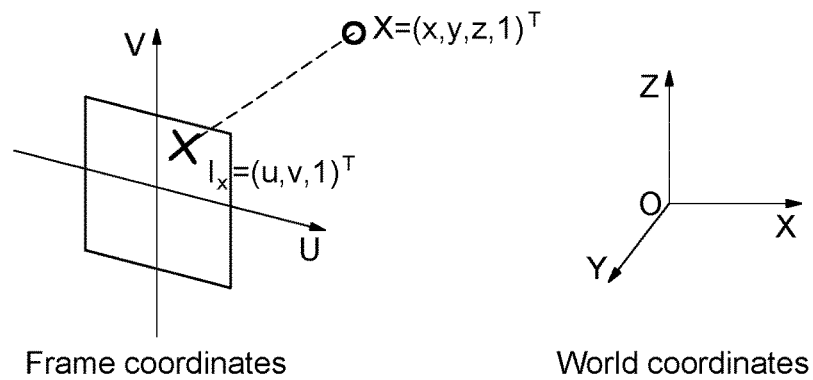
FIG. 4 illustrates coordinates notation.
Figure 5:
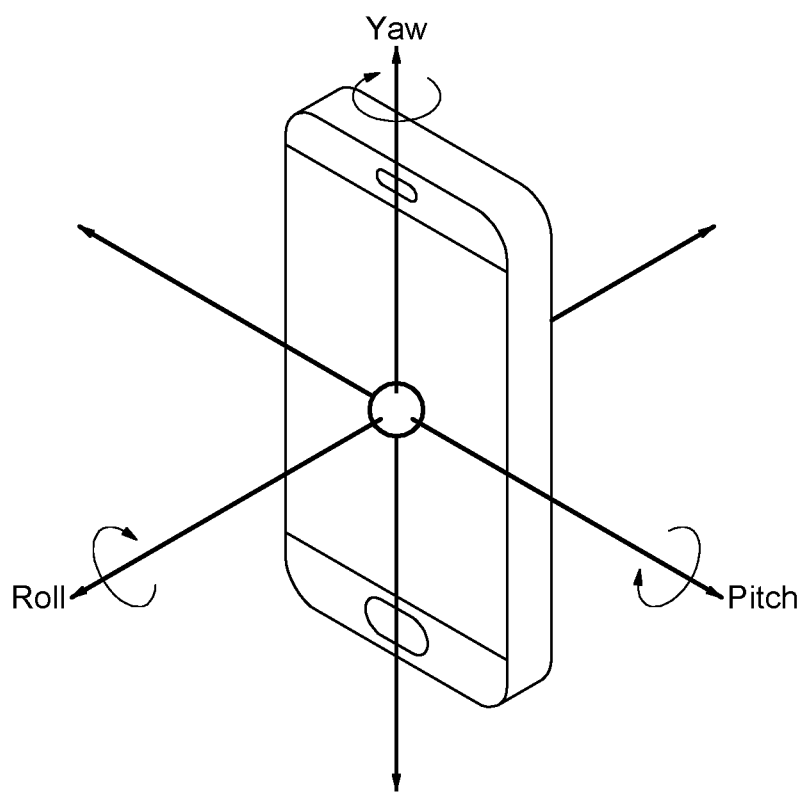
FIG. 5 illustrates a smartphone with an example of Euler angles, FIGS. 6 to 7 detail others embodiments of a method according to the disclosure.
Figure 6:
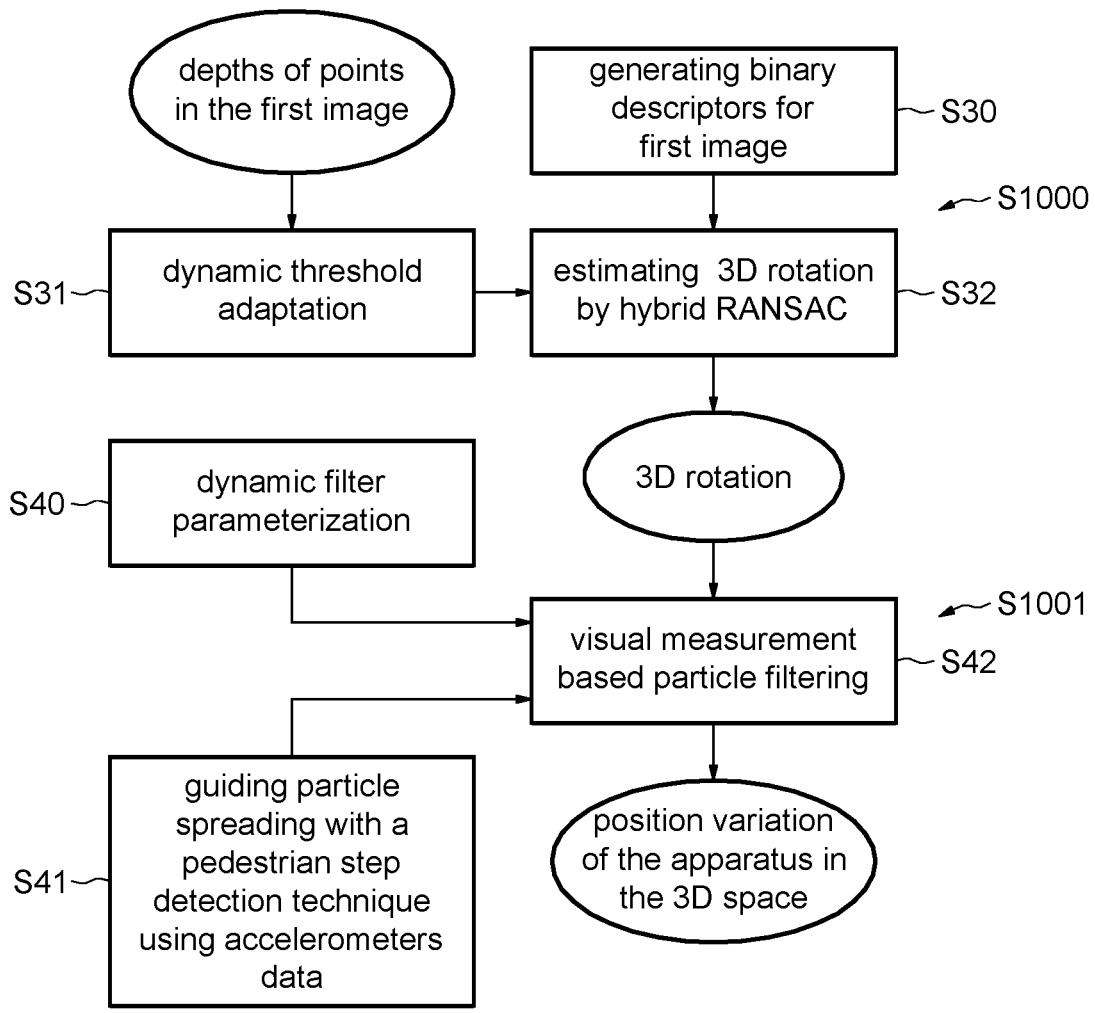
Figure 7:
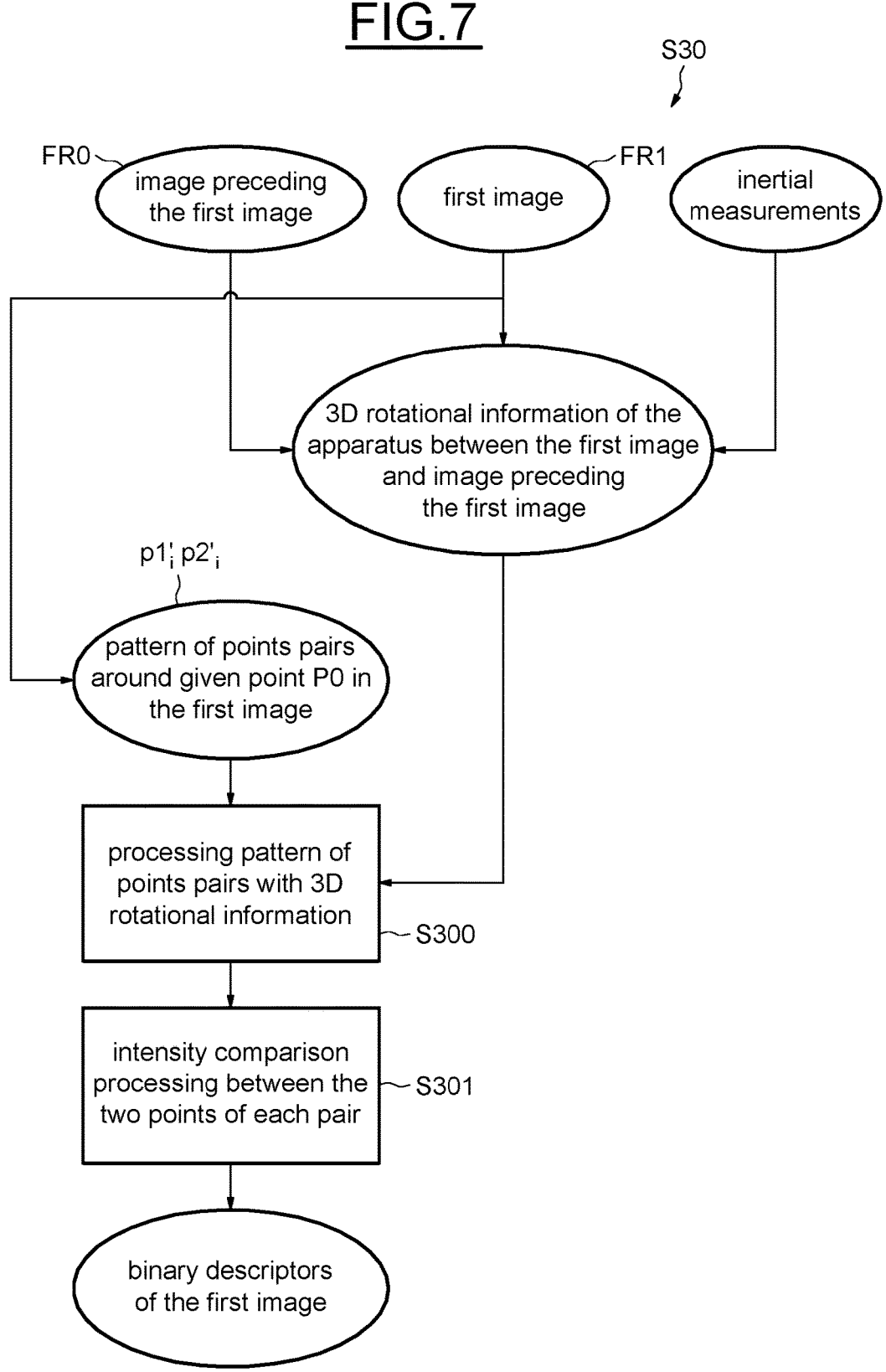
Figure 8:
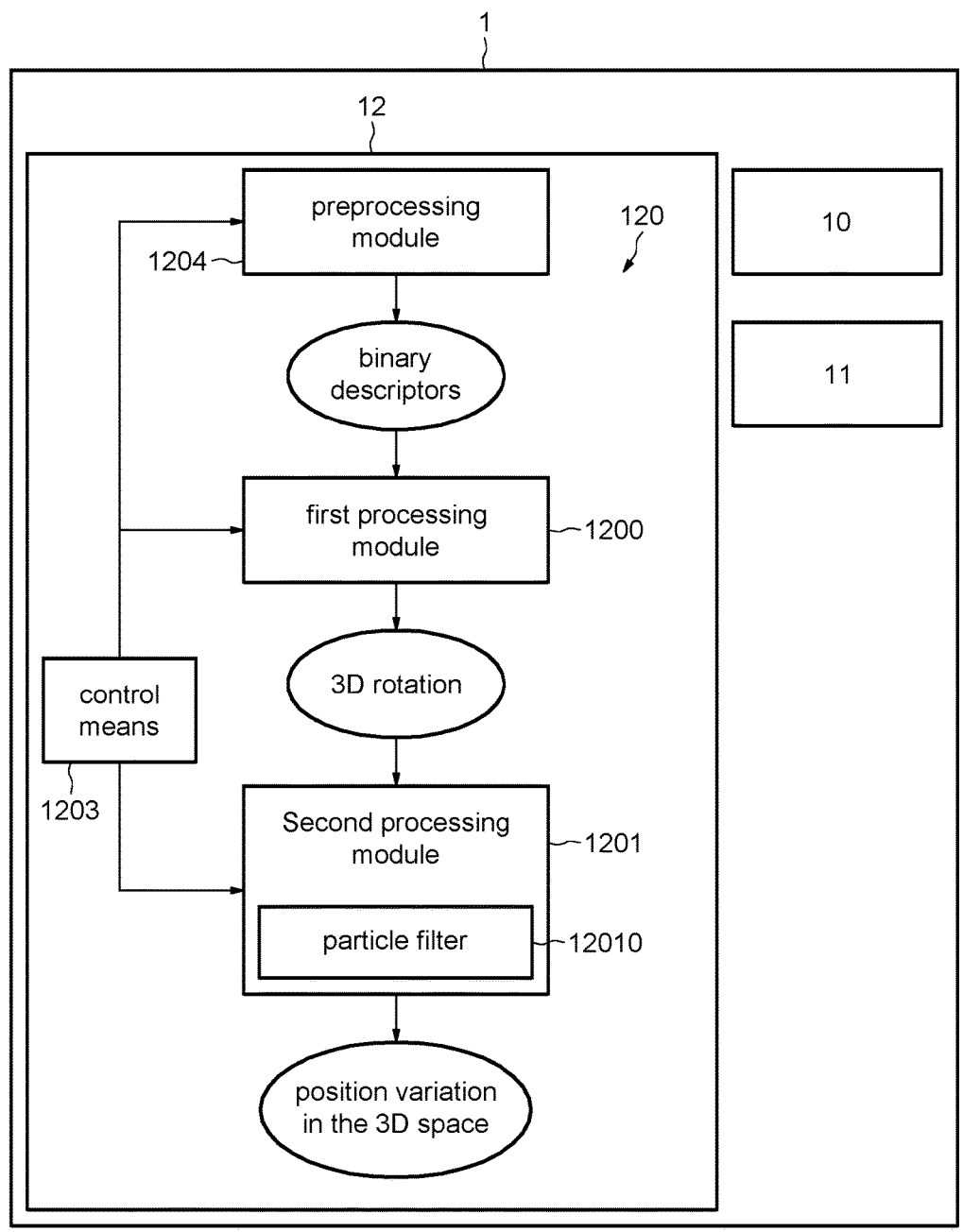
FIG. 8 illustrates schematically an embodiment of a device and of a platform according to the disclosure.

Before detailing particular embodiments with reference to FIGS. 6 to 8, general considerations will be now indicated with reference to FIGS. 3 to 5.

For motion estimation, a problem that arises is to adopt proper motion model representation. This will impact heavily some algorithmic and implementation choices and limitations.

A pinhole projective model is the classical model used for embedded video applications.

In two dimensions, the problematic revolves around restrictions to the planar motion, going from a pure translation to perspective models, and even some more specific ones.

In 3D the main concern is the type of rotation representations that can lead to singularities, difficulties in interpretation, and filtering problems.

The pinhole camera model describes the mathematical relationship between a 3D object viewed by the camera and its 2D projection on the image.

It possesses many limitations: it does not take into account the focus of the camera which creates blur and it does not directly model the discretization that occurs when translating projected image into pixels. In addition, Image distortions due to lenses are not considered.

However, this model is considered as a sufficient geometric approximation for many applications. The real final image plane presents a 180° rotation due to image rays crossing at the pinhole location.

As one can see on FIG. 3, the real final image plane presents a 180° rotation due to image rays crossing at the pinhole location. To simplify computation, a virtual image plane is often considered in front of the pinhole. All equations presented in this disclosure will be based on this virtual image, which will now directly be referred to as the image to clarify and lighten the subject.

We now consider a point X in 3D world homogenous coordinates: $X=(x, y, z, 1)^T$. The quantities x, y and z represent the world coordinates of the point. The image projection of the point X is noted $I_x$ with its 2D pixel coordinates $I_x=(u, v, 1)^T$, u and v being the horizontal and vertical pixel coordinates respectively. A scheme of this representation is displayed on FIG. 4.

The pinhole camera model describes the relationship between X and $I_x$.

This is made in two steps.

The first step explicitly models the geometric position and orientation of the camera with respect to world coordinates. This information is contained in a 3×4 projection matrix P=[R|t], where R is a 3×3 rotation matrix that encodes the orientation of the camera, and t a column vector of 3 elements, representing the position of the pinhole center of the camera.

The second step transforms the projection into pixel points. This is modeled by a camera matrix K. In some studies, K is named the intrinsic matrix.

$$K = \begin{pmatrix} f & 0 & c_x \\ 0 & f & c_y \\ 0 & 0 & 1 \end{pmatrix}$$

Where $f$ is the focal length of the camera, and $(c_x, c_y)^T$ the principal point of the camera, that defines the projection of the camera principal rays into the image's plane.

Note that a square pixel is considered here, otherwise one would define two distinct focal lengths for the horizontal and vertical axis of the camera. The complete relationship between pixel location $I_x$ and 3D coordinates X is thus: $I_x=KPX$ While one may consider on-the-fly computation of both K and P matrices, the camera matrix can be computed once in a calibration process and then is considered fixed. The method disclosed in Zhang, Z., 2000, A Flexible New Technique for Camera Calibration, IEEE Transactions on Pattern Analysis and Machine Intelligence, 22(11), pp. 1330-1334, which is incorporated herein in its entirety, can be used for example in order to compute the intrinsic camera matrix K.

A 2D transformation between two frames can be expressed in many different manners. To keep the notation homogenous and simple, the transformation using the coordinates changes of a point is represented. A 2D homogenous point $I_x=(u, v, 1)^T$ in the first frame (for example the previous frame) is mapped to a point $I'_x=(u', v', 1)^T$ in the second frame (for example the current frame) by the transformation.

The first type of motion that can be modeled is a direct translation $T=(T_x,T_y)$. It is has a very simple effect on the coordinates:

$$I'_x = \begin{pmatrix} u' \\ v' \\ 1 \end{pmatrix} = \begin{pmatrix} u + T_x \\ v + T_y \\ 1 \end{pmatrix}$$

The main characteristic of this motion model is that it only has 2 degrees of freedom. Therefore it is computable from only one point correspondence from a local motion estimation technique or a global one such as integral projections.

The limitation in terms of motion is very restrictive, and makes it only usable for very closely recorded frames, for example for video encoding, where every block's motion is estimated with a local translational motion model. This type of model can also be used in panorama and stabilization, if in-plane rotation is not considered.

Another type of 2D motion model is the rotation-preserving isometry, which correspond to an in-plane rotation by an angle θ combined with a translation:

$$I'_x = \begin{pmatrix} u' \\ v' \\ 1 \end{pmatrix} = \begin{pmatrix} \cos(\theta) & -\sin(\theta) & T_x \\ \sin(\theta) & \cos(\theta) & T_y \\ 0 & 0 & 1 \end{pmatrix} \begin{pmatrix} u \\ v \\ 1 \end{pmatrix}$$

Only one degree of freedom is added to the translation model, but has a point correspondence provides two pieces of data, two point correspondences are needed to compute the isometry. This motion model is widely used for video stabilization, providing translational and rotational movement estimation that can be filtered. It is also sometimes used in tracking applications, when the size of the object on the image is not expected to change during the sequence.

For non-subsequent image motion estimation, scale changes need to be added to the motion model. This type of model is called a similarity transformation, with a scale change of Z:

$$I'_x = \begin{pmatrix} u' \\ v' \\ 1 \end{pmatrix} = \begin{pmatrix} Z\cos(\theta) & -Z\sin(\theta) & T_x \\ Z\sin(\theta) & Z\cos(\theta) & T_y \\ 0 & 0 & 1 \end{pmatrix} \begin{pmatrix} u \\ v \\ 1 \end{pmatrix}$$

The augmentation of the model with scale opens up many application domains: long term tracking, recognition, etc.

Certain types of motions can lead to a deformation in the shape of the image. To include some simple transformations such as stretching or skewing it is needed to increase the number of parameter in the model:

$$I'_x = \begin{pmatrix} u' \\ v' \\ 1 \end{pmatrix} = \begin{pmatrix} a_{11} & a_{12} & T_x \\ a_{21} & a_{22} & T_y \\ 0 & 0 & 1 \end{pmatrix} \begin{pmatrix} u \\ v \\ 1 \end{pmatrix}$$

This type of representation is an affine transformation. For instance this model is mapped to deduce specific deformations, created by motions recorded with a rolling shutter sensor. The extension to affine model was needed as these distortions do not preserve the shape of the image. As the degree of freedom is increased to 6, three points correspondences are needed to create this type of representation.

The last extension of this type of representation presented here is the projective transformation. The form of the transformation is the following:

$$I'_x = \begin{pmatrix} u' \\ v' \\ w' \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} u \\ v \\ 1 \end{pmatrix}$$

Note than the third coordinate is modified in the final image point $I'_x$, to retrieve the final location of the point on the image, one should divide the coordinates of the point by w'. This model is needed when modeling "out-of-plane" transformations, for instance 3D rotations. It is useful in applications requiring the tracking of a planar structure moving freely in a scene.

3D motion representation is a complex subject. Many types of model exist, but only the most applied in the context of general motion estimation purposes is indicated here.

Many representations for three dimensional rotations exist.

One of them comprises quaternions.

Quaternions possess a lot of mathematical history and backgrounds. They constitute a group based on the four dimensional vector set $R^4$ with specific operator for multiplication 'o'. The sub-group $S^3$ corresponds to quaternions of unit length, and is used to represent rotations. A quaternion $q=[q_x, q_y, q_z, q_w]^T$ encodes a rotation of angle $\theta$ around a unit 3D axis $\mu$ as:

$$[q_x, q_y, q_z, q_w]^T = \left[\mu\sin\left(\frac{\theta}{2}\right), \cos\left(\frac{\theta}{2}\right)\right]^T$$

Formulas used to compute a rotation matrix R and its partial derivates based on quaternions members are well-known by the man skilled in the art. As for rotation matrices, quaternions possess more members (4) than the degree of freedom of a 3D rotation (3). When performing filtering or optimization on quaternions representing rotations, one must ensure that their length is kept unit. This is very simply done by dividing each member of the quaternion by the total norm of it, which is much simpler than the orthonormalization used by rotation matrices.

Quaternions have numerous advantages over Euler angles (see below) and direct rotation matrices when it comes to representing rotations, they offer a good balance between numerical properties and do not present artifacts. They are widely used for inertial sensor fusion.

A rotation can be represented as a 3×3 matrix R. Every column of it are of unit length and mutually orthogonal, and the determinant of the matrix is +1. This type of matrices constitutes the SO(3) (for special orthogonal) group. Each matrix belonging to this group is a 3D rotation, and any composition of matrices from this group is a rotation. This representation of a rotation is the most direct one to apply, as a 3D point $X=(x, y, z, 1)^T$ is transformed by R to a point $X_{rot}=(x_{rot}, y_{rot}, z_{rot}, 1)^T$ by a simple 4×4 matrix multiplication based on the rotation R:

$$X_{rot} = \begin{pmatrix} R & 0 \\ 0 & 1 \end{pmatrix} X$$

It must be noted that most of the other rotations representations are converted to a rotation matrix to be applied. The main drawback of the rotation matrix is the complexity of the constraints to keep the matrix in the SO(3) group when applying optimization of filtering techniques. In effect, those techniques will modify the coefficients of the matrix, but it should always be orthonormalized to belong to the SO(3) group. This is done at heavy cost and is performed at each step of the algorithm where the matrix is modified.

Euler angles are the most used representation for 3D rotations. It involves separating the rotations to a minimal 3 angle values that represent the respective rotations around the axis of the coordinates in a sequential way. They are referred to as the yaw, the pitch and the roll angles. These three values are either expressed in degrees or radians. In order to apply the transformation to a point, the Euler angles are transformed into separate rotation matrices, which are combined to form the total rotation matrix that is then applied to the point. In this disclosure, it is referred to the yaw as α, the pitch as β, and the roll as γ. A big issue in using Euler angles is to establish a convention on the order of application of the angles. In effect, one can select which angle represents a rotation around an axis, as well as the order chosen to apply them. This can create confusion and misunderstandings.

In FIG. 5, an example of the axis displayed on a smartphone scheme is represented.

A 3D motion is a combination of a rotation and a translation $\tau=[\tau_x, \tau_y, \tau_z]^T$. As seen previously, one must always convert a rotation to a rotation matrix in order to apply it to a point. The complete motion regrouping a rotation R and a translation τ is applied to a point X by:

$$X' = \begin{pmatrix} R & \tau \\ 0 & 1 \end{pmatrix} X$$

Estimating the frame to frame camera motion in a video sequence is a highly studied problem. It is a key step in many applications: camera stabilization, rolling shutter distortions correction, encoding, tracking, image alignment for High Dynamic Range, denoising . . . .

The first step of this type of technique is generally to extract motion vectors between pairs of images. This is performed by putting in correspondences points from one frame to another.

Many factors can impact the performance of these methods. In a sequence, illumination changes can occur, modifying the pixels values from one frame to another. In-plane rotations create another dimension in the problem, which can no longer be solved as a 2D translation estimation. Motion artifacts, such as motion blur or rolling shutter distortions also intervene in the process, creating variation in terms of pixel values and localizations. Finally, scene characteristics can make a great impact on the results of those techniques: a lack of texture in the scene, low-light heavy noise, etc.

A first category of algorithm makes use of pixel-wise computation. For a set of fixed given points in the first frame, a correspondence is searched in the second frame. This can be performed either for every point, which is generally called optical flow, or in a sparse manner, with techniques such as block matching or tracking.

For block-based/tracking methods, the first stage is selection of points on the first frame (with a grid pattern for instance) or every points for dense methods. Then the technique consists in finding the corresponding locations of the selected points in the second frame.

The main drawback of block-based/tracking methods for pixel motion estimation, is that every pixel does not carry the same amount of useful information. For instance, estimating the motion of a white point on a white wall is much more challenging than a black point on the same wall. If a motion needs to be estimated from two images that present changes in terms of conditions and location, it is needed to have robustness to various transformations such as illumination changes, rotation, scale . . . .

Approaches of feature extraction have been designed with the goal of finding locations in the images that carry the most information and distinctiveness. Many types of feature exist, including points, blobs, edges . . . . Points and blobs are however present in most types of sequences which makes them suitable for embedded applications. These points of interest are called keypoints.

The second category of vector generation techniques involves extracting points of interest (keypoints) in every frame, rather than using fixed points (or every point) in the frame. Descriptors of each set of points are then computed, which consist in a higher-level, more robust information on the surrounding of the keypoint. Correspondences are then drawn between these two set of points, in an operation known as matching.

Many feature detection methods exist.

One of these methods is based on an auto-correlation function α of a point $p=[u, v]^T$ and a shift $[\Delta u, \Delta v]^T$:

$$a(p, \Delta u, \Delta v) = \sum_{i=-N}^{i=N} \sum_{j=-N}^{j=N} (I(u+i, v+j) - I(u+\Delta u+i, v+\Delta v+j))^2$$

If this auto-correlation is small in every direction, this translates a uniform region with little interest. Only a strong value in one direction most likely indicates a contour. If every direction displays strong values however, the point is considered as being a keypoint. With a first-order Taylor approximate, the auto-correlation matrix can be expressed in function of spatial derivate of the image. The keypoint evaluation is then made with regard to the eigenvalues $\lambda_1, \lambda_2$ of that matrix. The corner-ness function is:

$$f(p) = det(a(p)) - k(trace(a(p)))^2 = \lambda_1 \lambda_2 - k(\lambda_1 + \lambda_2)^2$$

If this value at pixel p is higher than a threshold and higher than cornerness function f evaluated on neighborhood points, the point is considered a corner. The threshold can be set in function of the total desired number $N_{corners}$ of corners, or an absolute quality desired. The fact that the detectors consider all directions of a gradient matrix induces its robustness to illumination changes as well as in-plane rotations.

Other methods have been designed based on the gradient matrix to detect corners.

A very light extractor in terms of computational time known by the man skilled in the art under the acronym FAST (Features from Accelerated Segment Test) has been disclosed in:

Rosten, E. & Drummond, T, 2006. *Machine Learning for High-Speed Corner Detection, Lecture Notes in Computer Science* (including subseries Lecture Notes in *Artificial Intelligence and Lecture Notes in Bioinformatics*), 3951 LNCS, pp. 430-443, or in Rosten, E., Porter, R. & Drummond, T, 2010. *Faster and Better: A Machine Learning Approach to Corner Detection, Pattern Analysis and Machine Intelligence, IEEE Transactions on*, pp. 1-35.

FAST is an algorithm to extract keypoints designed to be the lightest possible strategy, sparing computational resources for other tasks. It is a corner detector based on the Bresenham circle of radius 3 around a point p, which is simply the "pixelized" version of a circle. This circle contains 16 points, if a certain amount $N_{radius}$ of contiguous points' intensities are all either lower or brighter than the point p (plus/minus a threshold τ), the point p is considered a corner.

It has been shown that using the $N_{radius}=9$ (9 contiguous points are used to detect a corner) was a very good choice compared to other values, such as $N_{radius}=12$.

The main drawbacks of this feature detector are:

Reliance on a threshold r that highly influences the performance of the extractor.

No detection on multiple scale, it is only a corner detector. It is however possible to achieve multiple scale detection thanks to pyramidal strategies.

It is highly sensitive to image noise, as a single pixel that changes value can break the contiguous pixel arc.

Several detectors have been developed to cope with scale invariance. They consist in searching the scale-space dimensions of the image and finding the extrema of an operator, which can be the gradient, Laplacian, etc. The image is first convolved by a Gaussian Kernel to smooth noise. Values are then normalized with respect to scale, and a point that possesses the highest absolute value of the neighborhood is then considered an interest blob (a keypoint with higher scale than just a pixel). The Laplacian has been demonstrated to be the best operator to choose.

In this context, the so-called Scale Invariant Feature Transform (SIFT) detector is presented in Lowe, D. G., 2004, *Distinctive Image Features from Scale-invariant Keypoints.*, pp. 1-28, and makes use of the difference of Gaussian approach between scales. For every scale, the Laplacian operator is approximated by a difference between two Gaussian smoothed images with different values for Gaussian smoothing. Maxima/minima are then detected by comparing every point with its direct neighborhood in the space scale dimensions, reducing the number of comparisons needed to only 26 neighbors.

Keypoint descriptor techniques have been also developed to provide invariant representation of the surroundings of the desired area. The SIFT descriptor is a robust keypoint descriptor. The descriptor is based on the scale extracted from the keypoint as explained above. It determines a dominant rotation in the scaled patch around the point. Image gradients are then computed in zones, and a soft assignment is made to map them into 8 discrete orientations. The normalized histogram of gradient strengths in each direction for every spatial zone constitutes the descriptor. It is a 128-dimensional vector of continuous numbers: 4×4 spatial zones times 8 orientations.

SIFT is still a widely used descriptor but its main drawback being that the L2-norm (also known as Euclidian norm) between two 128-dimensional vector can become very expensive to compute, especially when computing similarities between many points.

Taking into account the computer quickness in computing the binary Hamming distance (just a XOR operation followed by a bit count), recent techniques were developed to produce binary descriptors.

Binary descriptors and light detectors (such as FAST) provide simple yet effective methods to perform local motion estimation with a maximum efficiency of computation. However, binary descriptors and light detectors also raise some drawbacks:

Descriptors are binary and neither very flexible nor interpretable: one cannot extract information or modify the descriptor directly.

As matching techniques will be used, the error on measurement is not easy to model, which can be a problem for filtering or optimization techniques.

Some of the binary descriptors are known for presenting slightly lower robustness to geometric changes than more complex ones.

An example of binary descriptor is the one called "Binary Robust Independent Element Features (BRIEF)", which utilizes pairwise comparisons along a determined pattern to build a binary string descriptor. The pattern is built with a random generation technique based on a Gaussian sampling that has been proven superior against other sampling strategies.

More precisely, the BRIEF descriptor generation has been introduced in Calonder, M et al., 2010. *BRIEF: Binary Robust Independent Elementary Features. In Proceedings of the European Conference on Computer Vision. ECCV'10.* pp. 778-792. It is based on a pattern of point correspondences around the point p to be described. Many types of pattern exist.

Given a pattern of predefined pairs $(C_i, C'_i)$ in the pixel patch around the point p, the BRIEF descriptor $D_p$ is built as follows:

Every pixel in the patch is smoothed with a 9×9 Gaussian Kernel with a σ value of 2 (multiple values of the parameters where tested, these ones had the best results)

For every pair $(C_i, C'_i)$:

if $I(C_i) < I(C'_i)$ then $D_p(i)=1$, otherwise $D_p(i)=0$

Where $D_p(i)$ is the value of the binary descriptor $D_p$ at index i. The total number of pairs $n_d$ is very often a multiple of 8, therefore the descriptor has a length of $n_d/8$ bytes. The common values for $n_d$ are 128, 256 or 512. Comparisons between two descriptors are made with the Hamming distance, which is simply computed with a XOR operation followed by a bit count that can be implemented very efficiently on a classical processor.

The global movement between two successive video images may be estimated via a homography model, typically a 3×3 homography matrix modelling a global movement plane. Typically, homography matrices are estimated between successive images using feature matching between these images. Algorithms for estimating such matrices between successive images are well known to the person skilled in the art and for all useful purposes the latter may refer to the essay entitled "Homography Estimation," by Elan Dubrofsky, B.Sc., Carleton University, 2007, THE UNIVERSITY OF BRITISH COLUMBIA (Vancouver), March 2009.

The RANSAC (abbreviation of Random Sample Consensus) algorithm is well known to the person skilled in the art and is notably described in the article by Fischler et al., entitled "Random Sample Consensus: A Paradigm for Model Fitting with Applications to Image Analysis and Automated Cartography," Communications of the ACM, June 1981, Volume 24, No. 6. The RANSAC algorithm is a robust parameter estimation algorithm used notably in image processing applications. It is used for estimating the global movement between two images by testing a number of homography models.

More precisely, in a first step, a generally minimal set of points in the current image, e.g., a triplet of points, is selected randomly from among all the points (pixels) available in a current image. The assumed corresponding triplet of points in the next image is extracted and from these two triplets a homography matrix representing a movement model hypothesis is estimated.

This model hypothesis thus obtained is then tested on the complete set of image points. More precisely, for at least some of the image points, an estimated point is calculated using the tested model hypothesis. The back-projection error between this estimated point and the assumed corresponding point in the next image is determined.

Points not following the model, i.e., of which the back-projection error is greater than a threshold T, are called outliers. Conversely, the nearby points of the model hypothesis are called inliers and form part of the consensus set. The number thereof is representative of the quality of the estimated model hypothesis.

The preceding two steps (choice of a model hypothesis and test on the set of the points) are repeated until the number of iterations reaches a threshold defined by a formula taking into account the desired percentage of inliers and a desired confidence value. When this condition is true, the model hypothesis that led to this condition is then considered as being the model of the global movement between the two images.

However, the calculation time of the RANSAC type algorithm is very variable and depends notably on the number of points tested and the quality of the points. Indeed, in an easy image, notably displaying numerous feature interest points in the image, the assumed corresponding points will easily be found in the next image. But this will not be the case in a difficult image. This variability in calculation time is generally not compatible with the use of such an algorithm in processors embedded in mobile cellular telephones or digital tablets, for example.

Consequently, in such embedded applications a Preemptive RANSAC type algorithm is preferably used, which is well known to the person skilled in the art. The Preemptive RANSAC type algorithm is described, for example, in the article by David Nistér, titled "Preemptive RANSAC for Live Structure and Motion Estimation," Proceedings of the Ninth IEEE International Conference on Computer Vision (ICCV 2003) 2-Volume Set.

In the Preemptive RANSAC algorithm, a set of K homography models, constituting a K model hypotheses to be tested, is first defined from a set of points in the current image (called a hypothesis generator points set) and their matches in the previous image. Typically, K may be between 300 and 500.

Then, all these models are tested, in a similar way to that performed in the conventional RANSAC algorithm, on a first block of image points, e.g., 20 points. At the conclusion of this test, only a portion of the model hypotheses tested is kept, typically those which have achieved the highest scores.

For example, a dichotomy may be performed, i.e., keeping only half of the model hypotheses tested. Then, the remaining model hypotheses are tested using another block of points, and here again, for example, only half of the model hypotheses tested that have obtained the highest scores are kept.

These operations are repeated until all the points are exhausted or a single model hypothesis is finally obtained. In the latter case, this single remaining model hypothesis forms the global model of movement between the two images. In the case where there remain several model hypotheses but more points to be tested, the hypothesis adopted is that with the best score.

However, although the Preemptive RANSAC algorithm has certain advantages notably in terms of calculation time, which makes it particularly well suited for embedded applications, and also for parallel processing, movement estimation is less flexible and sometimes not really suitable for extreme cases. Thus, for example, if a person or an object moves in an image field, it may happen that the movement estimator is focused on the person, producing a result that does not match the movement of the camera, which could, for example, provide incorrect video stabilization.

An improvement has been disclosed in U.S. Patent Publication No. 2016/0105590), incorporated by reference herein in its entirety, enabling the quality of the image sequence to be improved, and in particular, in certain specific situations. Such an improvement is called Hybrid Ransac and uses information originating from at least one inertial sensor, e.g., at least one gyroscope, in combination with the visual information for improving the estimation of the movement between two successive images.

As illustrated on FIG. 6, estimating said 3D rotation is performed (S32) by a RANSAC type algorithm, preferably an hybrid RANSAC algorithm.

When estimating the movement of the apparatus, for example 3D rotation, a 3D change in position can be seen as noise.

In RANSAC type algorithm, the noise is modeled the same way for each point (the threshold is the same for each point).

However the noise is non-uniform in the whole image reducing thus the precision in the motion estimation.

It is thus proposed to take into account this non-uniform noise. In this respect said hybrid RANSAC algorithm comprises preferably a dynamic threshold adaptation S31 using depths of points in the first image FR1.

As a matter of fact two points in the first image have different depths. Those points have also different depths in the second image after a motion, for example a translation, of the apparatus (camera) between the first position and the second position.

Thus the displacement of a first point between the first image and the second image is greater than displacement of the second point between the first image and the second image because the depth of the first point A is different from the depth of the second point in the first image.

Thus said adaptation S31 of the threshold is advantageously made and each point has its own threshold.

More precisely we assume here a movement of an apparatus (for example a camera) between each current pair of first and second successive video images captured by said apparatus.

A phase of testing a plurality of model hypotheses of said movement is performed by the hybrid RANSAC algorithm.

Although said movement of the apparatus between the two images may be any movement, in particular a movement in a plane, said movement is advantageously here an eventual orientation modification of said apparatus between the first image and the second image (i.e., an eventual 3D rotation of said apparatus between the first image FR1 and the second image FR2).

Each model hypothesis may thus comprise Euler angles.

Each model hypothesis is for example obtained from motion vectors by using for example block-based/tracking methods or preferably keypoints extraction methods.

Said phase of testing operates on a set of first points in the first image and a set of first assumed corresponding points in the second image so as to deliver the best model hypothesis.

This best model hypothesis defines the movement of the apparatus between the first image and the second image.

The set of first points may include all the image points or preferably only some of those points, for example keypoints (or points of interest).

Those keypoints may be determined by using for example the above mentioned FAST algorithm.

Said phase of testing may comprise for each first point in the first image, calculating a corresponding estimated point using the tested model hypothesis, determining the back-projection (or reprojection) error between said estimated point and the assumed corresponding point in the second image, and comparing each back projection error with a threshold.

Points not following the model, i.e., of which the back-projection error is greater than the threshold, are called outliers.

For performing said dynamic threshold adaptation, the threshold associated with the first point is determined by using a fixed threshold and a correction term.

The threshold is for example the sum of the fixed threshold T and said corresponding correction term.

The correction term takes into account an estimation of the depth of said first point in said first image and an estimation $M_{est}$ of the spatial movement of the apparatus between the first and the second images. $M_{est}$ is the expected distance of the apparatus during its movement.

More precisely the correction term is equal to $M_{est} \cdot f/z_i$, where f is focal length of the apparatus (camera for example) and $z_i$ the depth of the first point.

The depth $z_i$ may be estimated or obtained for example by a depth sensor included in the apparatus, for example a Time-Of-Flight sensor, a stereo camera, an infrared sensor, or by a 3D cartography of the image obtained for example by the SLAM type algorithm.

Turning now to the step S1001 of estimating the position variation of the apparatus in the 3D space, it comprises advantageously, as illustrated in FIG. 6, a visual measurement based filtering and preferably a visual measurement based particle filtering S42.

As a matter of fact inertial sensors offer a good complementary estimation to vision when it comes to rotational motion. For camera position estimation however, they do not provide reliable information. On the other hand, visual based motion estimation also has difficulties regarding repetitive or low textured contents, typically found for example in large rooms. Therefore there is a need for a flexible position estimation, which could cope with very low quality measurements without drifting too much, and re-converge when meaningful information is provided back.

Thus a particle swarm filter is preferably applied for the 3D position and velocity of the apparatus (camera).

Particle filtering is widely used in many domains of computer vision, from tracking to odometry. Also known as sequential Monte-Carlo estimation, it is a density estimator that utilizes a sampling strategy to represent the posterior density of the state probability [see for example Lui, J. S. & Chen, R., 1998. Sequential Monte Carlo Methods for Dynamic Systems. *Journal of the American Statistical Association*, 93(443), pp. 1032-1044, incorporated by reference in the present patent application].

Said apparatus is intended to capture a sequence of images, the first image FR1 being captured at said first instant, the second image FR2 being captured at said second instant.

Said motion includes a rotation of the apparatus and the position variation.

Said position variation includes a position and a velocity.

In the present no limitative example, said motion is an ego-motion of the apparatus between the first image and the second image including a 3D rotation of the apparatus and a position variation of the apparatus in the 3D space.

The particles filtering is used for estimating said position and velocity from the probabilistic-weighted average of the particles.

Each particle is for example a virtual apparatus, such as a virtual camera.

Said particle filter uses the known estimation of said rotation and is parameterized for taking into account a quality of said rotation estimation.

The known estimation of the rotation, for example the 3D rotation, has been obtained by performing the hybrid RANSAC algorithm (step S32) providing an inliers rate $\tau_{inlier}$.

Based on the 3D/2D visual measurements v(i), now supposedly outlier free with the hybrid RANSAC procedure, the estimation S1001 of the camera position and velocity is performed.

The estimated 3D position at frame t is noted $\hat{D}_t$, the estimated velocity is noted $\hat{V}_t$.

Each particle (which is a virtual camera) $\xi_i^t$ has its own position $d_i^t$ and velocity $v_i^t$.

The algorithm comprises two steps.

Firstly, the position $d_i^t$ is computed according to the following equation:

$$d_i^t = d_i^{t-1} + v_i^{t-1}$$

Secondly, the probability of each particle with respect to the measurements $\pi(\xi_i^t | v(1, \ldots, N))$ is computed. In order to estimate these probabilities, the previously calculated rotation $h(j_{best})$ (motion model) is used.

The Euler angles are converted to an axis $k_{best}$ and angle $\theta_{best}$ representation.

Then the Rodrigues formula is used in order to obtain the corresponding rotation matrix:

$$R_{best} = I + K_{best} \sin \theta_{best} + K_{best}^2 (1 - \cos \theta_{best})$$

With $K_{best}$ being the cross-product matrix of the vector $k_{best}$.

A projection matrix $P_l$ is therefore generated for every particle: $P_l = [R_{best} | d_l]$.

Inlier measurements points are projected into the frame for every particle, with projection matrices $P_l$.

The reprojection error of measurement v(i) for particle $\xi_i^t$ is noted $\varepsilon_i^l$.

$\pi(\xi_i^t | v(1, \ldots, N))$ is computed as:

$$\pi(\xi_i^t | v(1, \ldots, N)) = 1/\sum_i \varepsilon_i^l$$

The estimated position and velocity are calculated as the probabilistic-weighted average of the particles.

$$\hat{D}_t = \sum_i \frac{\pi(\xi_i^t | v(1, \ldots, N))}{\pi_{tot}} d_i^t$$

With $\pi_{tot} = \Sigma_i \pi(\xi_i^t | v(1, \ldots, N))$.

The particle with highest probability, $\xi_{best}^t$, is now used to compute the velocity of each particle.

As mentioned above, the particle filter is preferably dynamically parameterized (step S40) for taking into account a quality of the rotation estimation and said parameterization is used in the velocity estimation.

More precisely a first parameter κ is used in the velocity calculus to adapt dynamically the filter to the quality of tracking:

$$v_i^t = v_i^{t-1} + \kappa(d_{best}^t - d_i^t) + (1-\kappa) r(l)$$

r(l) is a random 3D vector, which is generated according to a Gaussian distribution $\mathcal{N}(\mu_r, \sigma_r)$. The choices of $(\mu_r, \sigma_r)$ will be explicated below.

κ dictates how heavily it is desired to emphasize the convergence to the best particle found in the current step. To make the filter reactive to the tracking quality, κ is set according to a relationship between the inlier rate found in the Hybrid RANSAC $\tau_{inlier}$, the reprojection error of the best particle $\varepsilon^{best}$, and a typical targeted reprojection error $\varepsilon^{typ}$:

$$\kappa = \tau_{inlier} e^{-\left(\frac{\varepsilon^{best}}{\varepsilon^{typ}}\right)^2}$$

Thanks to this specific dynamic parameterization, the particle filter reacts to the quality of the estimation, heavily diffusing the particles in case of very poor tracking, while providing a high convergence to the best particle in case of high quality tracking estimated.

As illustrated also on FIG. 6, estimating the velocity may further comprise guiding the particle spreading (step S41) with a pedestrian step detection technique using accelerometers data.

As a matter of fact inertial sensors, such as accelerometers, permit to perform step counting. Thus it is possible to know if the platform (for example the smartphone) is held by a walking person.

In such a case the particle diffusion is directed following the walking direction.

More precisely, according to an embodiment, the two parameters that can be tuned are ($\mu_r$, $\sigma_r$) which are the characteristics of the Gaussian distribution for particle velocity calculation.

$\mu_r$ is a vector representing a typical velocity expected for the second image.

If the person is detected as walking, $\mu_r$ is calculated as:

$$\mu_r = R_{current} * \begin{pmatrix} 0 \\ 0 \\ S_t/fps \end{pmatrix}$$

With $R_{current}$ being the current estimated rotation matrix, $S_t$ the typical velocity of step and $fps$ the frame rate of the camera. This parameterization will orientate the particle spreading forward, and help the algorithm to cope with walking motion, without explicitly including a motion model in the approach.

$\sigma_r$ may be constant or tuned.

As illustrated on FIGS. 6 and 7, it is also possible that said ego-motion estimating S100 further comprises, before estimating said 3D rotation, generating S30 for said first image FR1, binary descriptors (advantageously binary descriptors based on pairwise comparisons along a determined pattern, such as the BRIEF descriptors) describing visual features of said first image, each binary descriptor being associated with a given point P0 in said first image FR1.

Although a binary descriptor based on pairwise comparisons along a determined pattern, such as the BRIEF descriptor, is a very adapted descriptor for video sequences frame-to-frame local motion estimation, it is neither robust to in-plane rotation nor to viewpoint changes (yaw and pitch variations). While this lack of robustness is not necessary for a frame-to-frame memory less motion estimation, it is problematic for longer terms tracking of points. If an update of the descriptor is needed at every matching step, a simple mismatch can lead to wrong data association.

In this context, an improvement upon such binary descriptor, for example the original BRIEF descriptor, is proposed in order to increase its robustness to geometric changes while not adding to much complexity to such descriptor.

One characteristic of binary descriptors is to use a fixed pattern of point's pairs to apply comparisons.

It is proposed here to directly use the 3D rotation information on the pattern of point's pairs.

This allows much less computations than a full frame rotation, as for example the BRIEF pattern can contain up to 512 points, while for instance a 1280×720 pixels frame presents 921600 points.

More precisely, as illustrated on FIG. 7, said descriptor generation S30 comprises:

determining a pattern of points pairs $p1'_i$, $p2'_i$ around said given point P0 in the first image FR1, processing S300 said pattern of points $p1'_i$, $p2'_i$ of said first image with a tridimensional rotation information, obtained for example from inertial measurements, representative of said apparatus rotation between the first image FR1 and the image FR0 preceding said first image, and performing intensity comparison processing S301 between the two points $p1'_i$, $p2'_i$ of each pair (i is the index of the binary descriptor and the index of the pair).

More particularly processing said pattern of points of said first image comprises, for each point $p1'_i$ of each pair $p1'_i$, $p2'_i$ of said pattern, determining the bidimensional coordinates ($u1'_i$, $v1'_i$) of said point $p1'_i$ from the bidimensional coordinates ($u1_i$, $v1_i$) of the homologue point $p1_i$ in the previous image FR0 and from an in-plane rotation matrix R (p0, $\gamma_t$) corresponding to an in-plane rotation of an in-plane angle around said given point P0.

In this example said in-plane angle is the roll $\gamma_t$ measured at time t.

Said given point P0 is advantageously a keypoint which can be extracted by using for example said FAST algorithm.

More precisely, $u1'_i = u1_i \cos \gamma_t - v1_i \sin \gamma_t$ $v1'_i = u1_i \sin \gamma_t + v1_i \cos \gamma_t$.

Then said determined bidimensional coordinates ($u1'_i$, $v1'_i$) of said point $p1'_i$ are converted into tridimensional coordinates ($u1'_i$, $v1'_i$, 0, 1). Note that a quaternion is used here.

Then a second rotation matrix representative of said tridimensional rotation information is determined.

Said second rotation matrix takes into account the yaw $\alpha$ and the pitch $\beta$ measured at time t.

Said second rotation matrix is applied to said tridimensional coordinates ($u1'_i$, $v1'_i$, 0, 1) of said point $p1'_i$ to obtain new tridimensional coordinates ($u1''_i$, $v1''_i$, $w1''_i$, 1).

Those new tridimensional coordinates ($u1''_i$, $v1''_i$, $w1''_i$, 1) are the projected back onto said plane of said in-plane rotation by using a projection matrix to obtain a projected point $Rp1_i$ having projected coordinates ($Ru1_i$, $Rv1_i$, 0).

And performing intensity comparison processing S301 between the two points of each pair comprises determining the intensity of the two projected points RP1i, RP2i of said pair and comparing both intensities.

More precisely, for example, if I(RP1i) is smaller than I(RP2i), the binary descriptor Di is equal to 1, otherwise Di is equal to 0.

In the first image FR1, said pattern of points may comprise pairs of points included in a zone of L×M points, for example 25×25, centered on said given point P0. The given point P0 is thus preferably, but not compulsorily, the origin of each points pair $p1'_i$, $p2'_i$.

In other words the two points (pixels) $p1'_i$, $p2'_i$ may be symmetric or not with respect to the given point P0.

We refer now more particularly to FIG. 8, which illustrates diagrammatically an embodiment of a platform 1, for example a smartphone or a tablet according to the disclosure including a device 12 according to the disclosure, an apparatus 10, like an image sensor 10, as for example a camera, and inertial sensors 11 such as a gyroscope and accelerometers.

The device 12 comprises processing means 120 for estimating an ego-motion of the apparatus 10 between the first image and the second image of a succession of images captured by said apparatus 10.

Said processing means 120 comprises a first processing module 1200 configured to perform an estimation of the 3D rotation of said apparatus and a second processing module 1201 configured to perform an estimation of the position variation of the apparatus in the 3D space, and control means 1203 configured to activate the first processing module 1200 and the second processing module 1201 after the first processing module has estimated said 3D rotation.

Said first processing module 1200 is configured to estimate said 3D rotation by the hybrid RANSAC algorithm.

Said first processing module 1200 is further configured to perform a dynamic threshold adaptation using depths of points in the first image FR.

The second processing module 1201 is configured to estimate the position variation of the apparatus in the 3D space by using a visual measurement based filter means comprising here a visual measurement based particle filter means 12010 using dynamic particle filter parameterization means.

The second processing module 1201 is further configured to guide the particle spreading of said particle filter means 12010 with a pedestrian step detection technique using accelerometers data.

The processing means 120 further comprises a pre-processing module 1204 configured to, before the estimation of said 3D rotation, generate for said first image, the above described binary descriptors describing visual features of said first image.

All these means and modules may be realized for example by a microprocessor executing software modules.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   estimating an ego-motion of an imaging device between capturing a first image and capturing a second image of a succession of images captured by said imaging device, in a Simultaneous Localization and Mapping (SLAM) algorithm that includes a localization part including said ego-motion estimating and a mapping part, wherein said ego-motion comprises a 3D rotation of the imaging device and a position variation of the imaging device in 3D space, and said ego-motion estimating comprises:
     estimating said 3D rotation of said imaging device; and
     estimating said position variation of the imaging device in the 3D space after estimating said 3D rotation; and
   generating a mapping of an environment of the imaging device based on the estimated ego-motion of the imaging device.

2. The method according to claim 1, wherein said SLAM algorithm is an hybrid SLAM algorithm.

3. The method according to claim 1, wherein estimating said 3D rotation is performed using a random sample consensus (RANSAC) algorithm.

4. The method according to claim 3, wherein estimating said 3D rotation is performed using a hybrid RANSAC algorithm that comprises a dynamic threshold adaptation using depths of points in the first image.

5. The method according to claim 1, wherein estimating said position variation of the imaging device in the 3D space comprises a visual measurement based filtering.

6. The method according to claim 5, wherein said visual measurement based filtering comprises a visual measurement based particle filtering using a dynamic filter parameterization.

7. The method according to claim 6, wherein estimating said position variation of the imaging device in the 3D space further comprises guiding particle spreading with a pedestrian step detection technique using accelerometers data.

8. The method according to claim 1, wherein said ego-motion estimating further comprises, before estimating said 3D rotation, generating for said first image, binary descriptors describing visual features of said first image, each binary descriptor being associated with a given point in said first image, said generating binary descriptors comprising determining a pattern of point pairs around said given point in the first image, processing said pattern of point pairs of said first image with a tridimensional rotation information, obtained from inertial measurements, representative of rotation of said imaging device between the first image and an image preceding said first image, and performing intensity comparison processing between points of each point pair.

9. A device, comprising:
   imaging circuitry, which, in operation, captures a succession of images, including a first image and a second image; and
   image processing circuitry, which, in operation,
     estimates an ego-motion of the device between capturing the first image and capturing the second image, in a Simultaneous Localization and Mapping (SLAM) algorithm that includes a localization part including said ego-motion estimating and a mapping part, wherein said ego-motion comprises a 3D rotation of the imaging device and a position variation of the imaging device in 3D space, and said image processing circuitry, in operation, estimates said 3D rotation of said device and estimates said position variation of the device in the 3D space estimating said 3D rotation; and
     generates a mapping of an environment of the device based on the estimated ego-motion of the device.

10. The device according to claim 9, wherein said SLAM algorithm is an hybrid SLAM algorithm.

11. The device according to claim 9, wherein said image processing circuitry is configured to estimate said 3D rotation by a random sample consensus (RANSAC) algorithm.

12. The device according to claim 11, wherein said image processing circuitry, in operation, performs a dynamic threshold adaptation using depths of points in the first image.

13. The device according to claim 9, wherein said image processing circuitry is configured to estimate said position variation of the imaging device in the 3D space by using a visual measurement based filter.

14. The device according to claim 13, wherein said visual measurement based filter comprises a visual measurement based particle filter using dynamic particle filter parameterization.

15. The device according to claim 14, wherein said image processing circuitry, in operation, guides particle spreading of said particle filter with a pedestrian step detection technique using accelerometer data.

16. The device according to claim 9, wherein said image processing is configured to, before the estimating of said 3D rotation, generate for said first image, binary descriptors describing visual features of said first image, each binary descriptor being associated with a given point in said first image, wherein generating the binary descriptors includes determining a pattern of points pairs around said given point in the first image, processing said pattern of point pairs of said first image with tridimensional rotation information, obtained from inertial measurements, representative of rotation of said imaging device between the first image and an image preceding said first image, and performing intensity comparison processing between points of each point pair.

17. An apparatus, comprising:
an imaging device configured to capture a succession of images, including a first image and a second image;
inertial sensors configured to sense movement of the imaging device; and
processing circuitry, which, in operation,
estimates an ego-motion of the imaging device between capturing the first image and capturing the second image, in a SLAM algorithm that includes a localization part including said ego-motion estimating and a mapping part, wherein said ego-motion comprises a 3D rotation of the imaging device and a position variation of the imaging device in 3D space, and said processing circuitry estimates said 3D rotation of said imaging device and estimates said position variation of the imaging device in the 3D space estimating said 3D rotation; and
generates a mapping of an environment of the device based on the estimated ego-motion of the device.

18. The apparatus according to claim 17, wherein said processing circuitry is configured to, before estimating said 3D rotation, generate for said first image, binary descriptors describing visual features of said first image, each binary descriptor being associated with a given point in said first image, wherein generating the binary descriptors includes determining a pattern of points pairs around said given point in the first image, processing said pattern of point pairs of said first image with tridimensional rotation information, obtained from inertial measurements, representative of rotation of said imaging device between the first image and an image preceding said first image, and performing intensity comparison processing between points of each point pair.

19. A non-transitory computer readable medium storing instructions that, when executed by a processor, perform a method comprising:
estimating an ego-motion of an imaging device between capturing a first image and capturing a second image of a succession of images captured by said imaging device, in a Simultaneous Localization and Mapping (SLAM) algorithm that includes a localization part including said ego-motion estimating and a mapping part, wherein said ego-motion comprises a 3D rotation of the imaging device and a position variation of the imaging device in 3D space, and said ego-motion estimating comprises:
estimating said 3D rotation of said imaging device; and
estimating said position variation of the imaging device in the 3D space after estimating said 3D rotation; and
generating a mapping of an environment of the imaging device based on the estimated ego-motion of the imaging device.

20. The non-transitory computer readable medium according to claim 19, wherein said ego-motion estimating further comprises, before estimating said 3D rotation, generating for said first image, binary descriptors describing visual features of said first image, each binary descriptor being associated with a given point in said first image, said generating binary descriptors comprising determining a pattern of point pairs around said given point in the first image, processing said pattern of point pairs of said first image with a tridimensional rotation information, obtained from inertial measurements, representative of rotation of said imaging device between the first image and an image preceding said first image, and performing intensity comparison processing between points of each point pair.

21. The non-transitory computer readable medium of claim 19 wherein the method comprises:
generating signals to control navigation of a robot based on the mapping of the environment of the imaging device.

22. The non-transitory computer readable medium of claim 19 wherein the method comprises:
generating an augmented reality image sequence based on the mapping of the environment of the imaging device.

23. The non-transitory computer readable medium of claim 19 wherein the estimating the position variation of the imaging device in the 3D space is based on the estimated 3D rotation of the imaging device in the 3D space.

24. The method of claim 1, comprising:
generating signals to control navigation of a robot based on the mapping of the environment of the imaging device.

25. The method of claim 1, comprising:
generating an augmented reality image sequence based on the mapping of the environment of the imaging device.

26. The method of claim 1 wherein the estimating the position variation of the imaging device in the 3D space is based on the estimated 3D rotation of the imaging device in the 3D space.

27. The device of claim 9 wherein the image processing circuitry, in operation, generates signals to control navigation of a robot based on the mapping of the environment of the imaging device.

28. The device of claim 9 wherein the image processing circuitry, in operation, generates an augmented reality image sequence based on the mapping of the environment of the imaging device.

29. The device of claim 9 wherein the estimating the position variation of the imaging device in the 3D space is based on the estimated 3D rotation of the imaging device in the 3D space.

30. A device, comprising:
imaging circuitry, which, in operation, captures a succession of images, including a first image and a second image; and
image processing circuitry, which, in operation,
estimates a 3D rotation of the device;
estimates a position variation of the device after estimating the 3D rotation of the device;
estimates an ego-motion of the device between capturing the first image and capturing the second image, in a Simultaneous Localization and Mapping (SLAM) algorithm that includes a localization part including said ego-motion estimating and a mapping part, based on the estimated 3D rotation and the estimated position variation; and
generates an augmented reality image sequence based on the estimated ego-motion of the device.

31. The device of claim 30 wherein said SLAM algorithm is an hybrid SLAM algorithm.

32. The device of claim 31 wherein said image processing circuitry is configured to estimate said 3D rotation by a random sample consensus (RANSAC) algorithm.

33. The device of claim 32 wherein said image processing circuitry, in operation, performs a dynamic threshold adaptation using depths of points in the first image.

34. The device of claim 30 wherein the estimating the position variation of the imaging device in the 3D space is based on the estimated 3D rotation of the imaging device in the 3D space.

* * * * *